Figure 1:
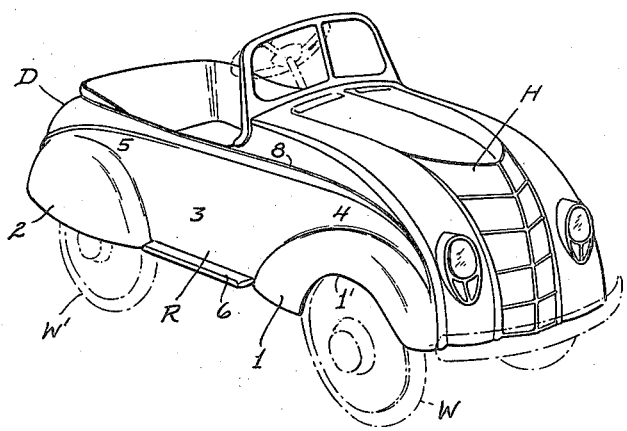

April 7, 1936.  H. L. KRAEFT  2,036,813
JUVENILE AUTOMOBILE BODY STRUCTURE
Filed Jan. 13, 1936  2 Sheets-Sheet 1

INVENTOR.
HERMAN L. KRAEFT
BY Bates, Goldrick & Teare
ATTORNEYS

April 7, 1936.　　　　H. L. KRAEFT　　　　2,036,813
JUVENILE AUTOMOBILE BODY STRUCTURE
Filed Jan. 13, 1936　　　2 Sheets-Sheet 2
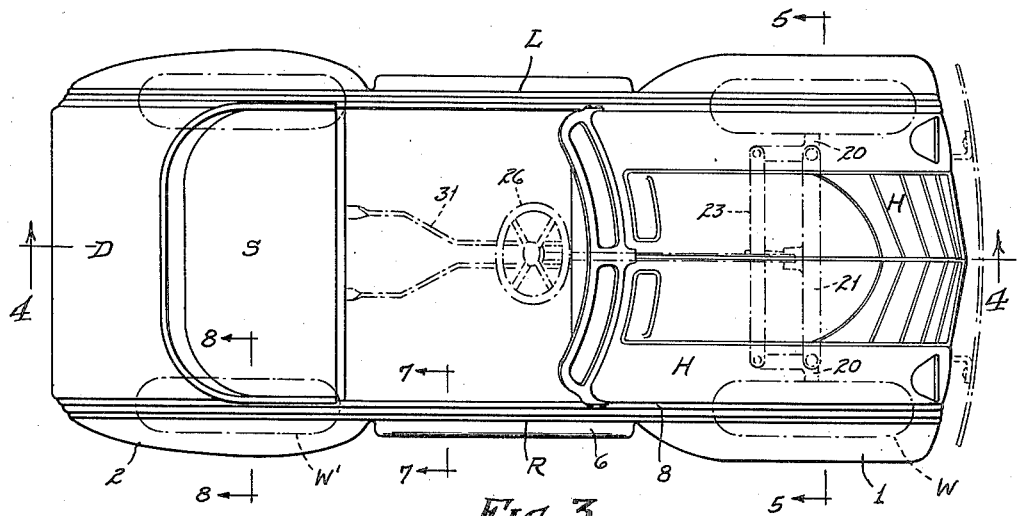
Fig. 3
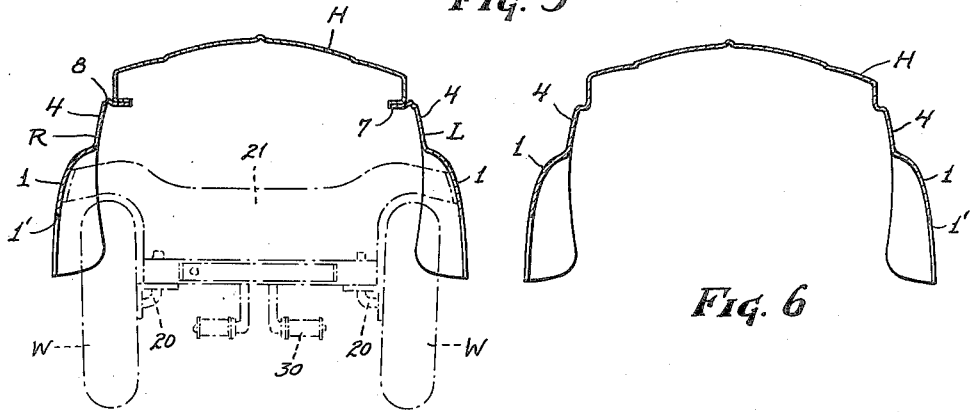
Fig. 5　　　　　　　　Fig. 6
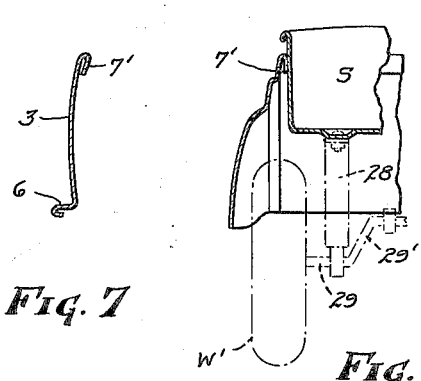
Fig. 7　　Fig. 8　　　　Fig. 9
INVENTOR.
HERMAN L. KRAEFT
BY
ATTORNEYS Patented Apr. 7, 1936

2,036,813

UNITED STATES PATENT OFFICE 2,036,813

JUVENILE AUTOMOBILE BODY STRUCTURE

Herman L. Kraeft, Cleveland Heights, Ohio, assignor to The Murray-Ohio Manufacturing Company, Cleveland, Ohio, a corporation of Ohio Application January 13, 1936, Serial No. 58,976

4 Claims. (Cl. 280—87.5)

The principal object of the present invention is to provide an improved and simplified sheet-metal body structure for juvenile vehicles, of the automobile type, that is to say, of the type adapted for dirigibility and pedal-drive and in which the child rides.

Manufacture of bodies for said type of juvenile vehicles requires the use of comparatively light sheet-metal, so that the vehicle will not have excessive weight, and, as ordinarily built, considerable reinforcing is necessary in order to obtain adequate strength. Ancillary parts, such as fenders, are made separately from the main body parts and attached thereto, as by welding or bolting. Separate body side sills are usually required, in order to properly resist both vertical and lateral strains, and to prevent relative weaving of the forward and rearward portions of the body.

I have found that by forming the front and rear fenders as semi-domes on a single side wall stamping, and by correspondingly or otherwise appropriately shaping the intermediate side wall, a very rigid body results, in which said stamping forms the principal stiffening elements for resisting weaving, side strains, and vertical bending moments imposed by the weight of the child's body.

An additional element of strength is secured if the upper portion of the stamping extends inwardly to form part of the top wall of the body. In some cases, where die cost does not thereby become prohibitive, the inturned portions may be integral with both of two side members, such as above outlined, so that a single piece of metal forms both sides and the connecting top wall, at least at one end of the body.

As shown in the drawings, one form has separate side stampings including front and rear semi-domoidal fenders, which are stream-lined in shape both for appearance and strength, and these are connected by forwardly and rearwardly disposed separate stampings. In the other form a single cross-portion of sheet metal forms the hood and cowl parts of the body and the cross-portion is integral with the sides.

Other objects and features of the invention will become apparent from the following description relating to the accompanying drawings, which show exemplary preferred forms. The essential characteristics are summarized in the claims.

Figure 2:
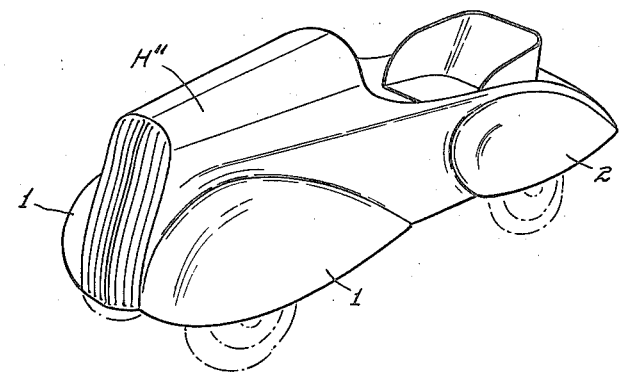
Figure 4:
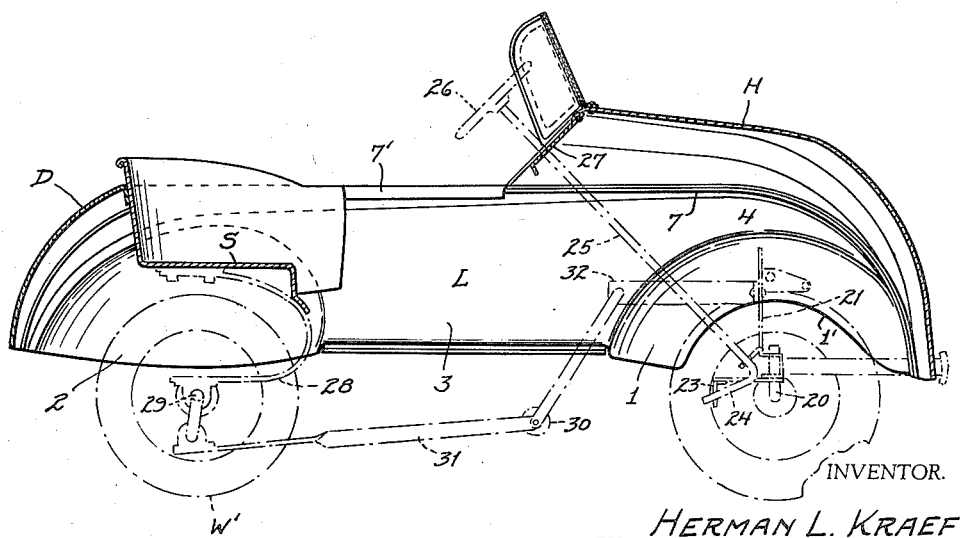

In the drawings, Figs. 1 and 2 are perspective views respectively showing two different types of juvenile automobile bodies incorporating the invention; Fig. 3 is a plan view of the body shown in Fig. 1; Fig. 4 is a longitudinal central sectional view, taken as indicated at 4—4 on Fig. 3; Fig. 5 is a transverse sectional view, as indicated at 5—5 on Fig. 3; Fig. 6 is a view similar to Fig. 5, (running gear omitted) the body being modified to the extent that the two sides are both integral with a single top wall; Fig. 7 is a detail transverse sectional view of one side of the body structure shown in Fig. 3, as indicated at 7—7 thereon; Fig. 8 is a detail view as indicated at 8—8 on Fig. 3, and Fig. 9 is a view corresponding in location to Fig. 5, but showing the body arrangement according to Fig. 2.

Referring first to the form of the invention illustrated in Fig. 1 and Figs. 3 to 6, inclusive, the side members R and L (designating right and left) are each formed as one piece metal stampings, each of which has semi-domoidal fender formations 1 and 2 near the two ends, said fender formations projecting laterally outwardly from the intermediate side-wall forming section or portion 3. The intermediate side-wall portion merges with both fender formations and extends over the tops of the fender formations, as indicated at 4 and 5. The side wall portion 3 is of substantial height throughout its length, being shown as beginning substantially even with the lower free edges of both fender formations 1 and 2, and extending upwardly beyond both fender formations.

The fender formations 1 and 2 are outwardly arched in cross-section in all normal transverse vertical planes, as well as being arched in all horizontal planes.

In order that the side members will have adequate structural strength to resist weaving of the forward and rearward portions of the body relative to each other, and so that the body will adequately resist lateral and vertical bending strains, all regions of the intermediate connecting portion 3 are preferably convexly arched similarly to the arch sections of the fender formations, as shown, for example, in Fig. 7, and, for further reinforcement as well as for the sake of appearance, the lower edge of the intermediate portion 3 may be formed into a bead or flange, as indicated at 6. This flanging or beading may be omitted in some cases, but when used, adds to the stiffness of the body sides.

The upper margin of each side member is preferably bent inwardly, continuously along the portions 3, 4 and 5; that is, from end to end of each body side member. The inwardly turned portions may form flanges, as indicated at 7, Fig. 5, for connection with separate top wall members of the body, or, as shown in Figs. 7 and 9, may form larger portions of the top wall as desired, or all of it.

In order to clear the dirigible front wheels, the undermargins of the fender formations 1 may be cut away as at 1' on arcs generally conforming to the contour of the wheels, as shown in Figs. 1 and 4; but in cases where the wheels are set relatively farther inwardly toward the axis of the body, the full semi-domoidal shape of the front fenders is retained, as illustrated, for example, in Fig. 2.

Referring now to the connecting top wall portions of the body, a forward hood member is shown at H, and this, in one form, (Figs. 1, 3 and 4) comprises a single piece stamping, which is arched in all transverse vertical planes and which is shown as curved downwardly at the front, terminating substantially even with the lower edges of the front fenders. The side members are also similarly connected by a rear deck member D, which may be formed similarly to the hood member H and may or may not be transversely arched. The hood and deck members preferably rest on top of the flange 7, being located by means of beads 8 on the top surfaces of the flanges. The overlying portions of the hood and deck members H and D are preferably welded to the flanges 7.

Conventional operating mechanism for the vehicle may be used, or such may be made in accordance with the disclosure of my prior application, Serial No. 9,001, filed March 2, 1935. For example, as shown in broken lines, the front wheels W may be carried on steering knuckles 20 which are pivoted to a cross-frame member 21 and operated by an appropriate cross-bar 23, Fig. 3, which is in turn controlled by an arm 24 on a steering post or shaft 25, having the usual steering wheel at 26. The upper end of the shaft 25 may be supported in an "instrument panel" 27, secured to the underside of the hood member H, but which forms no essential part of the present invention.

The rear wheels W' are carried on suitable spring suspension devices 28, carried by a seat structure S, the axle shaft 29 being of the usual bent form, providing cranks, as indicated at 29', operable by pedals 30, connected therewith, as by links 31. The pedals may be supported from the cross frame 21 on suitable brackets 32.

The seat structure S' may comprise a box-like stamping, set into place between the side members R and L and secured to suitable flanges on the rear deck member D and preferably also to downwardly turned portions 7' of the flanges 7, see Figs. 4 and 8.

Referring to Fig. 6 it will be seen that the structure is substantially the same as that of Fig. 5, except that the hood member H' is integral with the sides. The entire structure so formed is preferably arched in all transverse planes for maximum strength and stiffness against weaving and bending.

Referring specifically to Figs. 2 and 9, it will be seen that the construction of the forward portion of this body is essentially the same as that shown in Fig. 6, except for its decorative contour which is similar. Here the hood portion H'' forms with the side members a stepped arch, further steps on the arch being provided by the front fender formations.

Cutting away of the fender formations may be omitted, as suggested in Fig. 9, wherein it may be assumed that the wheel mountings and wheels (not shown) are set further inwardly from the sides. The seat structure (and rear top paneling, if used) may be in accordance with the above description of Figs. 1, 3 and 8.

I claim:

1. A one-piece side structure for a juvenile vehicle body, of the type in which a child rides, comprising a metal stamping having outstruck portions which are transversely arched in all vertical and horizontal transverse planes, said portions forming front and rear fenders, and having an intermediate connecting side wall portion which is transversely configured for vertical and lateral load resisting beam effect, the upper portion of said stamping being turned inwardly to form part of the top wall of the body.

2. A one-piece side structure for a juvenile vehicle of the type which a child rides, comprising a single piece metal stamping, having two outwardly bulged portions of semi-domoidal form stiffening the end regions of the stamping and providing front and rear fenders, and an intermediate upright connecting side-wall-forming portion, bent in a substantially horizontal direction at one margin to enable it to resist bending moments in planes normal to each other in the region between the bulged portions, said stamping being adapted to be secured to other body parts to complete the body.

3. A side member for a juvenile vehicle of the type which a child rides, comprising a single piece metal stamping, reinforced by two outwardly bulged portions which are arch-shaped in all horizontal planes and semi-arch shaped in all transverse vertical planes, said portions forming front and rear fenders, and an intermediate, upright, connecting side-wall-forming portion reinforced by being turned inwardly substantially coextensively with the stamping above the upper horizontal plane of the outwardly bulged portions.

4. A one-piece side for a body of a juvenile vehicle which a child rides, comprising a metal stamping having forwardly and rearwardly disposed outwardly bulged portions forming front and rear wheel fenders connected by a substantially upright integral intermediate side wall forming portion of substantial height throughout its length, said latter portion being transversely arched in cross-section throughout its length, whereby said stamping will resist vertical bending loads and side strains incident to supporting the weight of a child on a vehicle body incorporating said side and having no transverse bracing in regions between the front and rear fenders.

HERMAN L. KRAEFT.